J. BECKMANN.
ELECTRIC WELDING SYSTEM.
APPLICATION FILED JUNE 8, 1911.
1,052,030.
Patented Feb. 4, 1913.
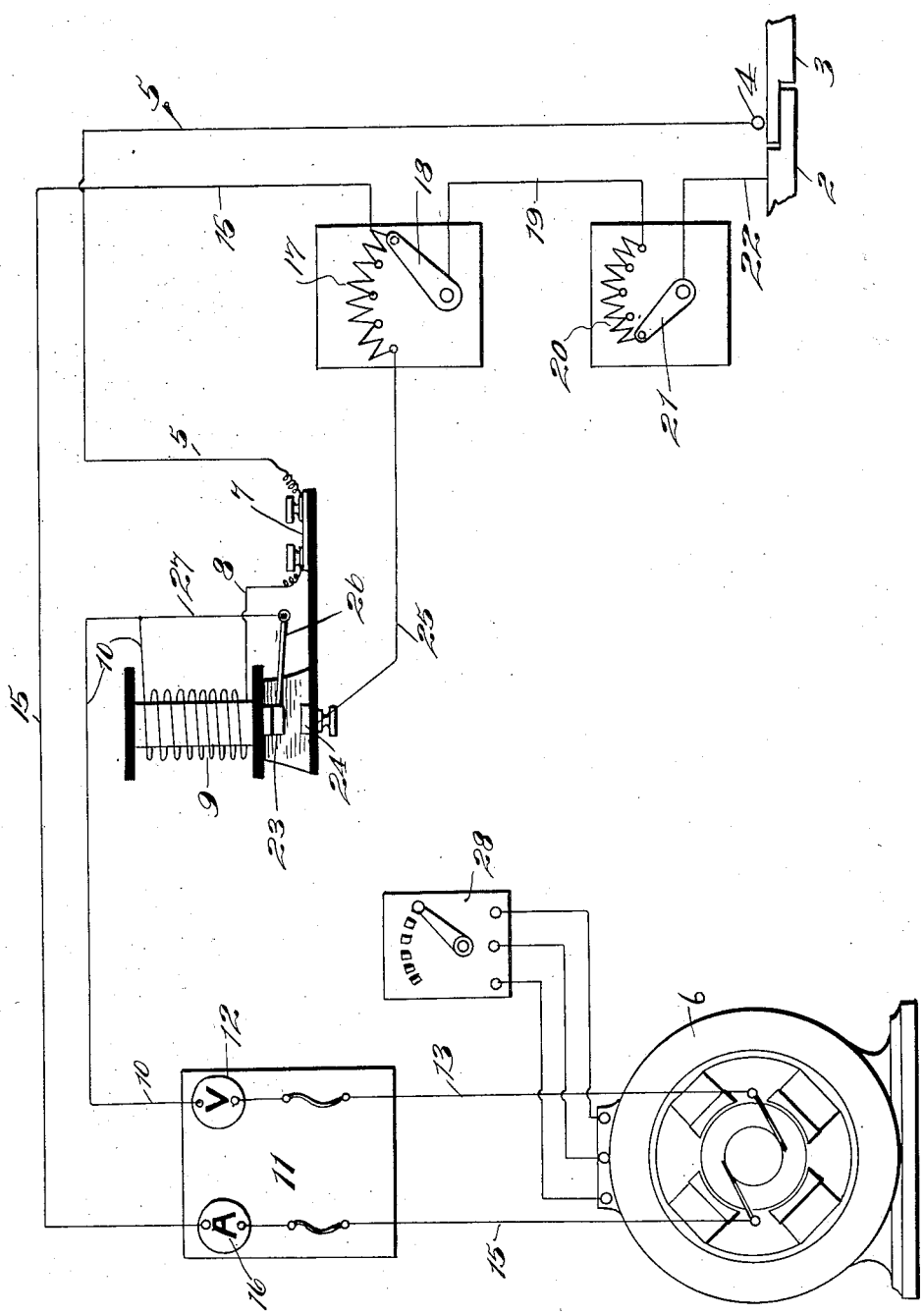

UNITED STATES PATENT OFFICE.

JOHN BECKMANN, OF ALAMEDA, CALIFORNIA.

ELECTRIC WELDING SYSTEM.

1,052,030.  Specification of Letters Patent.  Patented Feb. 4, 1913.

Application filed June 8, 1911. Serial No. 632,081.

*To all whom it may concern:*

Be it known that I, JOHN BECKMANN, a subject of the Emperor of Germany, residing at Alameda, in the county of Alameda and State of California, have invented new and useful Improvements in Electric Welding Systems, of which the following is a specification.

This invention relates to electrical systems, and particularly to an electric system for use in welding operations.

The object of the present invention is to provide a very simple system for the supply and control of electric current for the performance of welding operations, and which system includes instrumentalities for producing a large range or variation of power in the apparatus, and which will operate automatically to close a shunt or auxiliary circuit when the welding process is interrupted.

The invention consists of the parts and the construction and combination of parts, as hereinafter more fully described and claimed, having reference to the accompanying drawing in which the figure is a diagram representing the system.

In the illustrated embodiment of my invention, I have represented at 2 and 3 material to be joined by a weld, which will be the result of the application of electricity, by a suitable welding tool indicated at 4.

Current to perform the welding process of the material is conveyed to the point of operation by a conductor 5, which is of suitable length and may be sufficiently long to connect the welding tool 4, which may be in another locality, with the generating plant, indicated here as a generator 6, which may be established at a point considerably distant from where the welding operation will be performed.

The conductor 5 is connected with a contact-plate 7, through which current traverses over a conductor 8 wound upon a core to form a magnet indicated at 9, from which a return conductor 10 is led to a panel plate 11, upon which is mounted a volt-meter 12 connected by a conductor 13 which is connected to one pole of the generator 6. From the other pole of the generator is led a conductor 15, connecting with an ammeter 16, from which the current passes over the conductor 15 to the rheostat 17. The circuit is then led through an arm 18 of the rheostat, to which is connected a conductor 19 connecting with another or local rheostat, as at 20, the switch arm 21 of which is connected by a lead 22 to the material to be welded, as shown at 2.

When the operation of welding is to be performed, a current is completed through the welding instrument, indicated at 4, and through the connection 22; thence through the rheostat 21, conductor 19 and the switch 18 and partly or wholly through the rheostat 17; thence over the conductor 15 to the generator 6, out of the generator 6, over the lead conductor 13, through the volt-meter 12 on the conductor 10 to the magnet 9; thence on the lead 8 and from plate 7 on conductor 5 to the welding tool 4, forming a complete circuit by which an arc is created at the welding point to perform the welding. As thus described, a current of suitable voltage and amperage may be derived from the generator 6, and conducted to the main rheostat 17, from which instrument the strength or amperage of the current may be reduced from the maximum to the minimum by a movement of the arm 18 over the taps of the rheostat.

In operation when a weld is to be performed upon a certain character of material, the operator at the generator station sets the arm 18 of the rheostat 17 so as to deliver to the rheostat 20 a current of suitable maximum strength.

Since the auxiliary controlling rheostat 20 is located in convenient position to the operator while the operation is being performed, should the operator desire to reduce the strength of the current delivered at the welding point, he may move the arm of the rheostat 20 from a maximum to a minimum position and thus reduce amperage. When he desires to increase the current from the minimum to the maximum, he moves the switch arm 21 from the position of minimum amperage toward the position of maximum amperage on the rheostat 20. Thus it will be seen that a current of desired potentiality and amperage may be delivered to the rheostat 20 by adjusting the arm of the rheostat 17 at the maximum potential desired. The operator at the welding station may change the potentiality and amperage of the current derived from the rheostat 17 by adjusting the arm 21 of the rheostat 20.

A very important feature of the present invention is the provision of the rheostat 17 which enables the operator to control to a nicety the potentiality of the current before it reaches the local rheostat 20. Having once adjusted the main rheostat 17 to deliver a quantity of current, the welding operator does not have to concern himself with the generating plant, or any portion of the apparatus farther removed from him, other than the local control rheostat 20, and can always feel sure that once the main rheostat has been adjusted he can interrupt the current at the welding arc and can reestablish its use and obtain the same current that he was using before.

To protect the generator and the other appliances of the system against injury by the sudden cutting out of the welding arc, I have provided a circuit closing apparatus which is adapted to automatically open as soon as the welding process starts and to close instantly when the welding process is interrupted. In the present instance this circuit interrupting and closing device comprises an armature 23 mounted in the field of the magnet 9. The armature 23 will be actuated when a circuit is closed through the conductors 8 and 10 which are wound upon the magnet 9.

At the instant of the interruption of the circuit forming the welding arc, the magnet 9 becomes deënergized and allows the armature 23 to fall into engagement with a contact plug or piece 24, to which is connected a shunt branch 25 attached to that end of the rheostat 17 opposite to the end to which is connected the conductor 15; the resistance elements of the rheostat being in series with 15—25. When the member 23 contacts with the piece 24 a circuit is closed through the arm 26 of the armature, thence through a connection 27 which is secured to the conductor 10. Thus it will be seen that when the welding operation starts, a circuit is closed through the main leads 5, 8, 10 and 13 to the generator; thence through the lead 15 which is connected to the rheostat 17; thence following through the adjustable arm 18, over the conductor 19 and local rheostat 20 to the point of operation. When this circuit has been established the magnet becomes energized and actuates the circuit closing member 23 clearing it from the contact piece 24.

When the circuit is broken at the welding point, the magnet 9 is deënergized and allows the circuit closing member 23 to engage the piece 24, and a circuit is established which flows from the contact piece 24, through the branch 25 and the three-way rheostat 17; thence over the lead 15 to the generator; thence over the conductor 13 and conductor 10; thence down the connection 27 to the armature arm 26, completing the circuit at the plate 24.

By interposing in the main circuit an ammeter and a volt-meter, the operator in the generating station has full indication of the voltage in the circuit and of the amperage which is being utilized. At each adjustment of the rheostat arm 18 a corresponding variation is indicated on the ammeter 16, but any variation in the adjustment of the local rheostat 20 is not indicated at the ammeter, thus only indicating the ampere to which the rheostat 17 is adjusted and which current is delivered to the rheostat 20.

The operator in the welding station may adjust the rheostat arm 21 to obtain a current, the strength of which will be equal to the amperage that the rheostat 17 is adjusted to deliver by movement of the arm 18. The volt-meter indicates the voltage in the generator 6 and this voltage is controlled by a switchboard indicated at 28.

From the foregoing it will be understood that a leading advantage of the double rheostat is that where work is being done in large establishments, the main rheostat may be located several hundred feet from the forges where the work is being done. Changes in the electrical welding may occur and it is necessary that the operator at the welding point should be able to instantaneously change the current so as to prevent injury to the work. It is, therefore, necessary that he have this secondary control close to the work where he can instantly make such alterations in the strength of the current as the character of the work or the strength of the current requires, independent of the main distant control.

From the foregoing description it will be seen that I have provided a shunt or auxiliary circuit including a rheostat, the resistance of which is connected in series with the shunt line wires; one of the functions of the rheostat being to protect the generator against injurious shocks when the welding circuit is interrupted or broken. The rheostat 17 has the further function of acting as a distributer to the welding system; the strength of the current from the rheostat being controlled by the movement of the rheostat switch arm 18, which arm is connected to the welding line. In other words, the rheostat 17 is a three-way element through which all of the current will flow in the shunt circuit, when welding is interrupted, and from which any part of the current may be derived through the adjustment of the arm 18 to deliver the desired current from the rheostat to the welding line, which welding line is provided with an auxiliary rheostat for the further reduction of the current derived from the rheostat 17.

Having thus described my invention, what I claim and desire to secure by Letters Patent, is—

1. A welding system which includes in combination with a source of electrical energy, a welding implement, a lead conductor connecting the same to said source, a magnetic switch whose coil is in series in said conductor, a shunt circuit line connected to said switch and said generator, a main rheostat whose resistance element is in series in said shunt, said rheostat having a conductor arm to tap the shunt circuit at the rheostat, and a work line connected to said arm, through which arm and line a welding circuit is closed when the welding implement is in service and the shunt circuit broken by the energized magnet.

2. A welding system which includes in combination with a source of electrical energy, a welding implement, a lead conductor connecting the same to said source, a magnetic switch whose coil is in series in said conductor, a shunt circuit line connected to said switch and said generator, a main rheostat whose resistance element is in series in said shunt, said rheostat having a conductor arm to tap the shunt circuit at the rheostat, and a work line having an auxiliary rheostat connected to said arm, through which arm and line a welding circuit is closed when the welding implement is in service and the shunt circuit broken by the energized magnet.

3. In a welding apparatus, a source of electrical energy, a shunt circuit connected thereto, a main rheostat and arm having resistance elements connected in series in the shunt circuit, a switch for closing the shunt circuit and located between one post of the rheostat and said source, a welding circuit line connected to said arm and connectible to the part to be welded, a welding line including a magnet for operating the switch to break the shunt circuit, connected to the shunt circuit between said switch and said source, said switch being operative to open the shunt circuit when the welding lines are electrically related to the work, the welding current being controlled by the position of the arm as to the rheostat resistance, and a rheostat in the welding line for further controlling the current derived from the main rheostat, said last mentioned rheostat carrying all the current only when the switch is closed.

In testimony whereof I have hereunto set my hand in the presence of two subscribing witnesses.

JOHN BECKMANN.

Witnesses:
   JOHN H. HERRING,
   CHARLES EDELMAN.